United States Patent
Henning et al.

(10) Patent No.: US 6,658,990 B1
(45) Date of Patent: Dec. 9, 2003

(54) BUSHING CONSTRUCTION FOR A FLUID INJECTION MACHINE IN A FOOD PROCESSING SYSTEM

(75) Inventors: Dale C. Henning, West Chicago, IL (US); Peter Sprosty, Sandwich, IL (US)

(73) Assignee: Mepsco, Inc., West Chicago, IL (US)

( * ) Notice: Subject to any disclaimer, the term of this patent is extended or adjusted under 35 U.S.C. 154(b) by 176 days.

(21) Appl. No.: 09/723,773

(22) Filed: Nov. 27, 2000

(51) Int. Cl.[7] .............................. A22C 17/00; A22B 4/28
(52) U.S. Cl. ...................... 99/352; 99/420; 99/443 C; 99/448; 99/533; 99/535
(58) Field of Search .......................... 99/516, 646 R, 99/532–536, 352, 420, 443 C, 448, 349, 494; 426/510–511

(56) References Cited

U.S. PATENT DOCUMENTS

| | | | |
|---|---|---|---|
| 4,060,026 A | * | 11/1977 | Lohr et al. ..................... 99/346 |
| 4,228,193 A | * | 10/1980 | Schindler et al. ........... 426/233 |
| 4,690,046 A | * | 9/1987 | Corominas ................... 99/533 |
| 4,953,456 A | * | 9/1990 | Prosenbauder ............. 99/533 |
| 5,007,336 A | * | 4/1991 | Bernhardt et al. ............ 99/487 |
| 5,131,818 A | * | 7/1992 | Wittkop et al. ............. 417/273 |
| 6,263,785 B1 | * | 7/2001 | Zittel .......................... 99/348 |
| 6,419,971 B1 | * | 7/2002 | Mather et al. .............. 426/510 |

OTHER PUBLICATIONS

William Frazier and Dennis Westhoff, Food Microbiology 4th Edition, pp. 486–488, 1988.*

* cited by examiner

Primary Examiner—Drew Becker
(74) Attorney, Agent, or Firm—James Van Santen

(57) ABSTRACT

A multiple-use injection machine of the type used in food processing, is especially suited for selectively injecting treatment media into meat products including, inter alia, beef, pork, whole chickens and chicken parts. The treatment media is chose from a group including both liquid aqueous solutions utilized at normal ambient temperatures and normal operating pressures and a thermal treatment medium such as live steam at elevated temperatures and pressures. The multiple utilitarian capacity in a single injector machine is achieved by the use of bushings supporting the needles in their vertical position and supporting a seal in the manifold, but wherein the bushings are made of either a Polyetheretherketone material, or stainless steel, and the O-rings used for sealing are made of VITON brand heat resistant material or "TEFLON" brand

6 Claims, 6 Drawing Sheets

BUSHING CONSTRUCTION FOR A FLUID INJECTION MACHINE IN A FOOD PROCESSING SYSTEM

BACKGROUND OF INVENTION

1. Field of the Invention

This invention relates generally to machinery used in processing of beef, pork, whole chickens and chicken parts, and more particularly to an injection machine utilizing a specific bushing construction which may advantageously be used in machines for injecting various formulations and fluids, including marinade formulations, aqueous liquid solutions which may be corrosive, and for thermally conditioning food products with live steam at sufficiently high temperatures and pressures to insert sufficient thermal energy into the interior of the food product so that end point temperature meets Federal regulations.

2. The Prior Art

The prior art is exemplified by the practices of Stein-DSI, a business of FMC Food Technology. According to products sold to and used by customers of that company, machinery is provided wherein beef, pork, whole chickens, or chicken parts, are carried on a conveyor and are temporarily positioned under a press containing multiple hollow needles which are adapted to selectively receive a processing fluid under pressure. The press is operated to cycle up and down in a vertical path so that the points of the hollow needles penetrate the meat and inject the processing fluid into the interior portions of the meat.

In the current state of the art, the processing fluid is most often a marinade, i.e., a pickling liquid, or aqueous solution, usually of vinegar or wine with oil, herbs, spices etc. selected to steep the meat before cooking.

Such marinating operations are customarily performed on machines and equipment designed to inject liquid marinade which is relatively cool, for example, at or near room, or ambient, temperature. Thus, the machine function of meat penetration is performed with the use of hollow needles which can be reciprocated in a press which includes a manifold utilizing prior art sealing instrumentalities. Such seals can be fully effective only in the range of relatively low operating temperatures normally contemplated in such an operating environment.

However, in order to thermally treat food products with live steam at elevated temperatures and under pressure, such sealing means are completely unacceptable and are subject to failure, thereby rendering the machine ineffective for thermally conditioning purposes.

BRIEF SUMMARY OF THE INVENTION

The present invention contemplates the construction of an injection machine which utilizes a particularly effective combination of piercing needles and manifold parts in conjunction with a specific form of bushing construction performing two principal functions: (1) the bushing adequately supports the needle in its vertical position throughout a wide range of operating conditions, including thermal conditioning with live steam at elevated temperatures and, (2) the bushing supports an effective heat resistant seal to prevent leakage around the needle with which it is associated when used with live steam at elevated temperatures and under pressure.

Further, by virtue of the special constructions, featuring in one form of the invention, the use of bushing parts made of "POLYETHERETHERKETONE" (sometimes referred to by an abbreviation PEEK) and "O" ring seals made of "VITON," (a registered trademark of DuPont Dow Elastomers L.L.C. for a heat resistant material made of synthetic rubber and rubber compositions) and featuring in another form of the invention, the use of bushing parts made of stainless steel and "O" ring seals made of "TEFLON," (a registered trademark of E.I. DuPont De Nemours and Company for a chemical plastic compound with oil, water and stain repellant characteristics), the bushing constructions disclosed herein can be utilized with either conventional aqueous solutions such as marinade, or with corrosive solutions, at their normal usage temperatures, or with live steam at elevated temperatures in the order of about 350 degrees Fahrenheit and at increased pressures ranging from 15 to 55 pounds per square inch.

The structures thus provided allow the injector apparatus to exploit the characteristics of thermally pre-conditioning a food product, such as meat, to insure that the meat is fully cooked when processed in a large scale mass production processing environment. Live steam can be introduced into the manifold and injected with full and proper penetration of the meat so that elevated internal temperatures are achieved to promote full 100% bacterial kill in the final cooked meat product.

The sealing units provided in accordance with this invention are fully reliable with fluids at temperatures lower than the temperature of live steam, whether such fluids constitute gaseous fluids, corrosive solutions, or aqeous formulations such as marinade. Hence, the structures provided are universally applicable to food processing procedures in a wide range of application without necessitating duplication of large and expensive machinery.

DETAILED DESCRIPTION OF THE INVENTION

Figure 1:
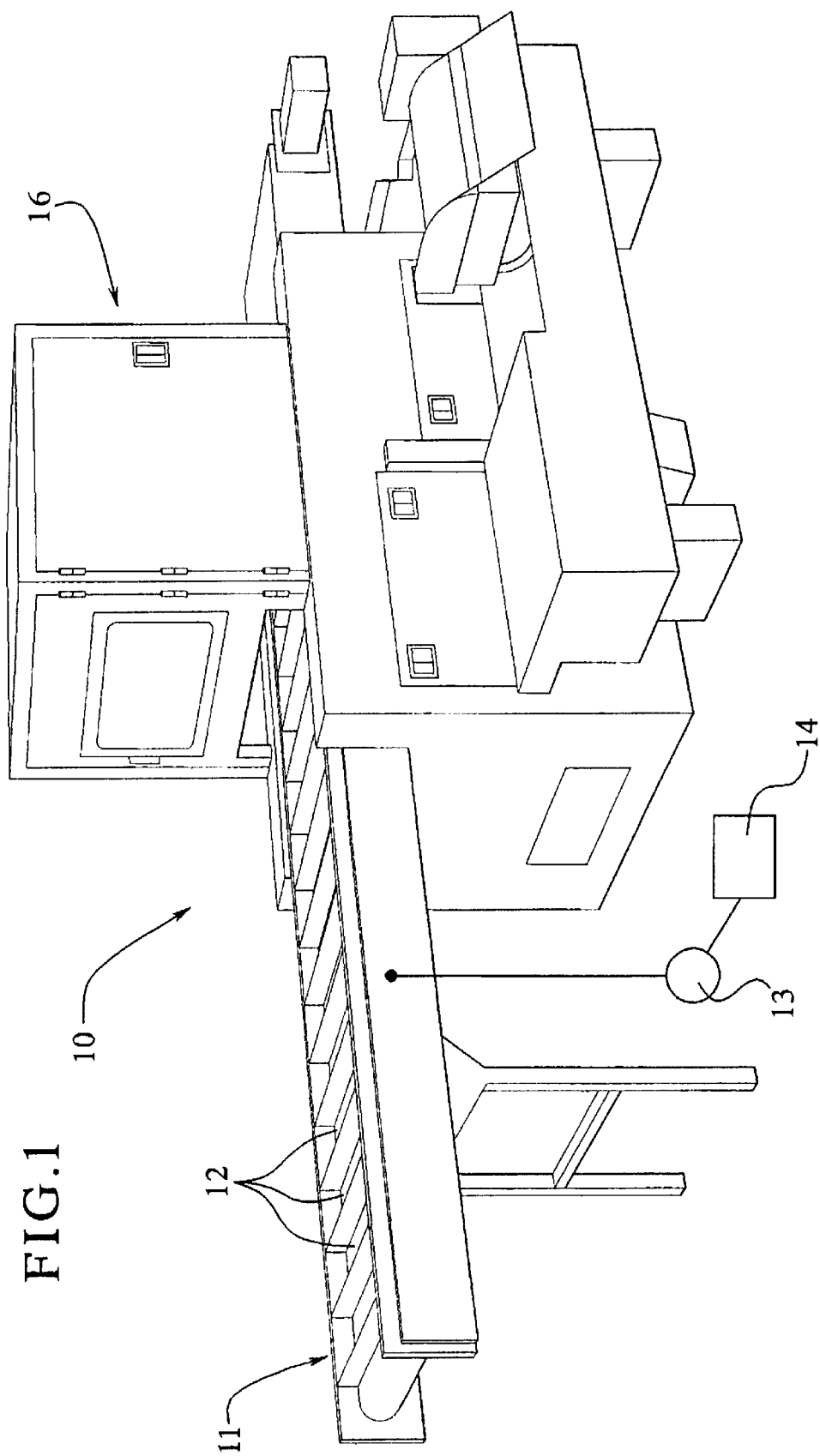
FIG. 1 is a perspective view of an injection apparatus of the type in which the inventive features of the present invention find a particular utility.

Referring to FIG. 1 of the drawings, there is shown an exemplary form of a food processing apparatus constituting an injection machine and embodying the improved features contemplated by the present invention and by means of which the novel steps of the methodology of the present invention may be practiced.

The advent of fast food restaurants has been accompanied by the development of food processing procedures designed to insure uniform high quality and good taste which will meet the expectations of consuming customers. Marination, or the injection of a marinade into beef, pork, or chicken meat, for example, is currently one of the standard practices of the food procsessing industry.

One of the problems confronting the industry is to insure that the chicken meat, for example, whether whole chickens, or chicken parts, is fully cooked to the extent required by government regulations, when processed in a mass production facility before packaging and shipping to a retail facility. Prior to cooking, the typical internal temperature of unfrozen, bone-in chicken parts is in the range of 40 to 45 degrees Fahrenheit. The internal temperatures must be raised to at least 160 degrees to measure up to the U.S.D.A. minimum temperature requirement with a poultry product to insure 100% bacterial kill. Comparable government regulations exist for other foods with respect to minimum lower end point temperatures.

To insure compliance with Federal regulations, food processors generally try to achieve a final internal temperature of 185–190 degrees Fahrenheit, so that all of the chicken parts on the line will be above the specified minimum before the meat is moved on to further stages of cooking, or thermal processing.

The particular improvement to which this disclosure is directed is the processing fluid injection apparatus shown generally at 10. While it should be understood that the principles of the present invention are applicable to any food product to which the food processing steps herein disclosed are applicable, we have described the inventive features as applied to an injection machine for inserting a treatment medium into a food product, but especially a meat food product, for example, such as chicken. Thus, chicken meat in the form of whole chickens, or chicken parts, labeled "C" are loaded on a tray-compartmented conveyor means 11 having a plurality of separate trays 12. The conveyor means 11 is driven by a power assisting means depicted schematically, such as a motor means 13 controlled by pre-settable control means 14. The pre-settable control means 14 is of the type that can be selectively programmed so that the trays 12 are successively stepped into and through a penetrating station which includes a press which is also controlled by the pre-settable control means 14. The press and the control means are enclosed within a closure designated at 16. It will be understood that the power assisting means would be part of the mechanism which is also enclosed inside of the enclosure 16 of the machine 10.

Figure 2:
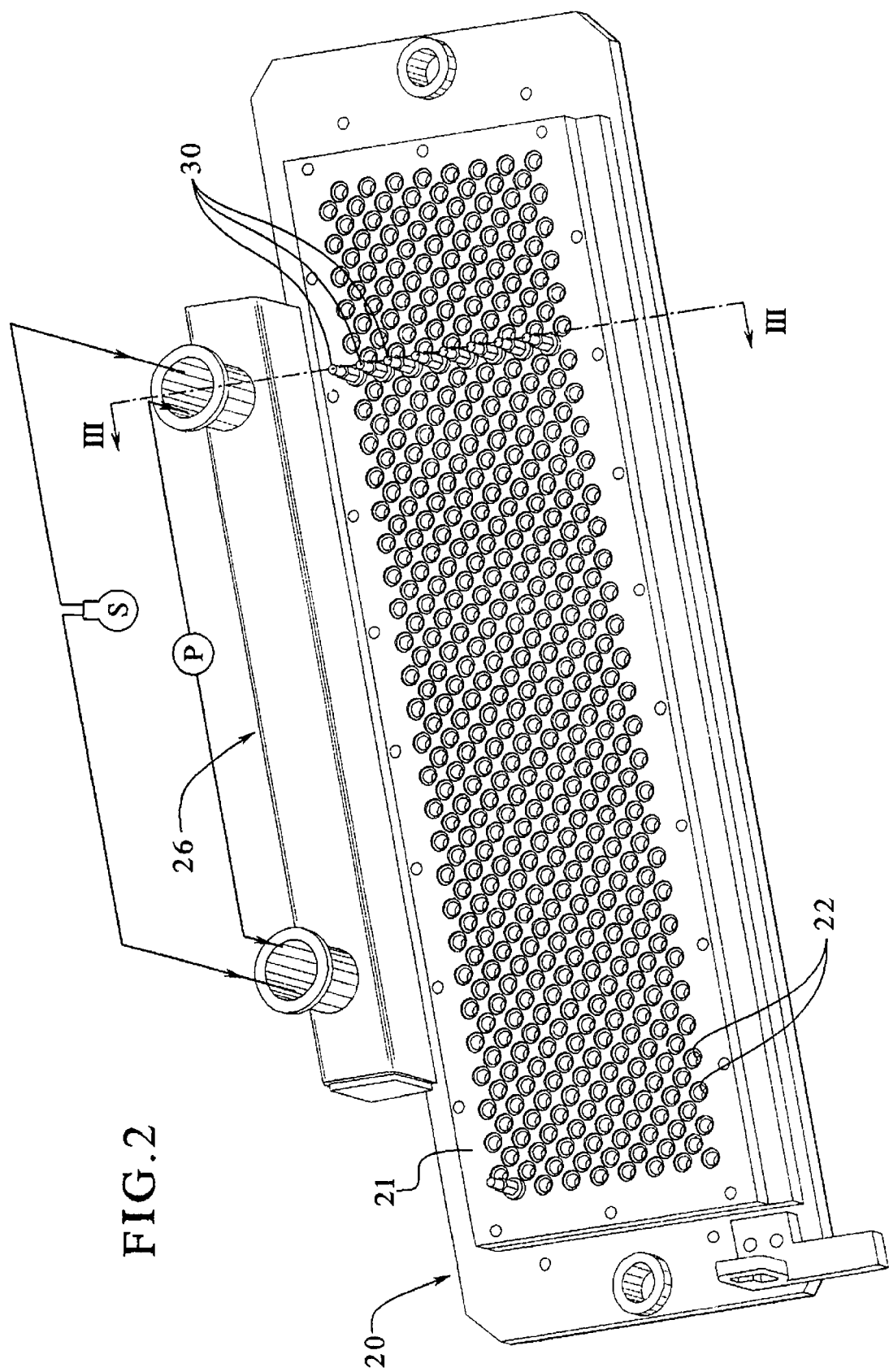
FIG. 2 is a plan elevational view of the upper manifold member utilized in the present invention with a brine head connected thereto, and illustrating only a single row of needles in place for purposes of simplifying the drawing disclosure.
Figure 3:
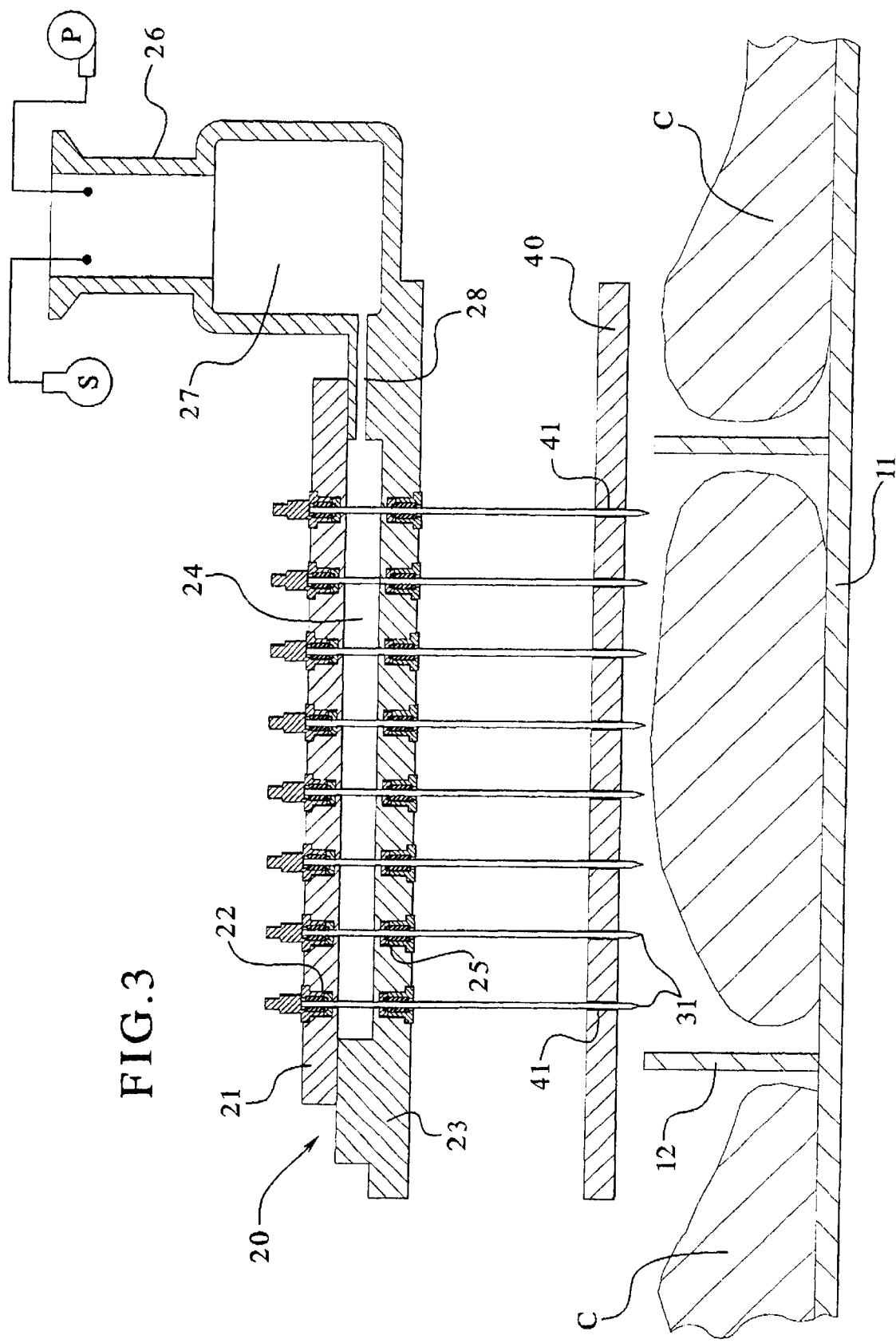
FIG. 3 is a cross-sectional view taken on the plane III—III of FIG. 2 and with a portion of a tray conveyor means added to illustrate the relationship of the injector machine press components with the needles in the upper position of the press stroke.
Figure 4:
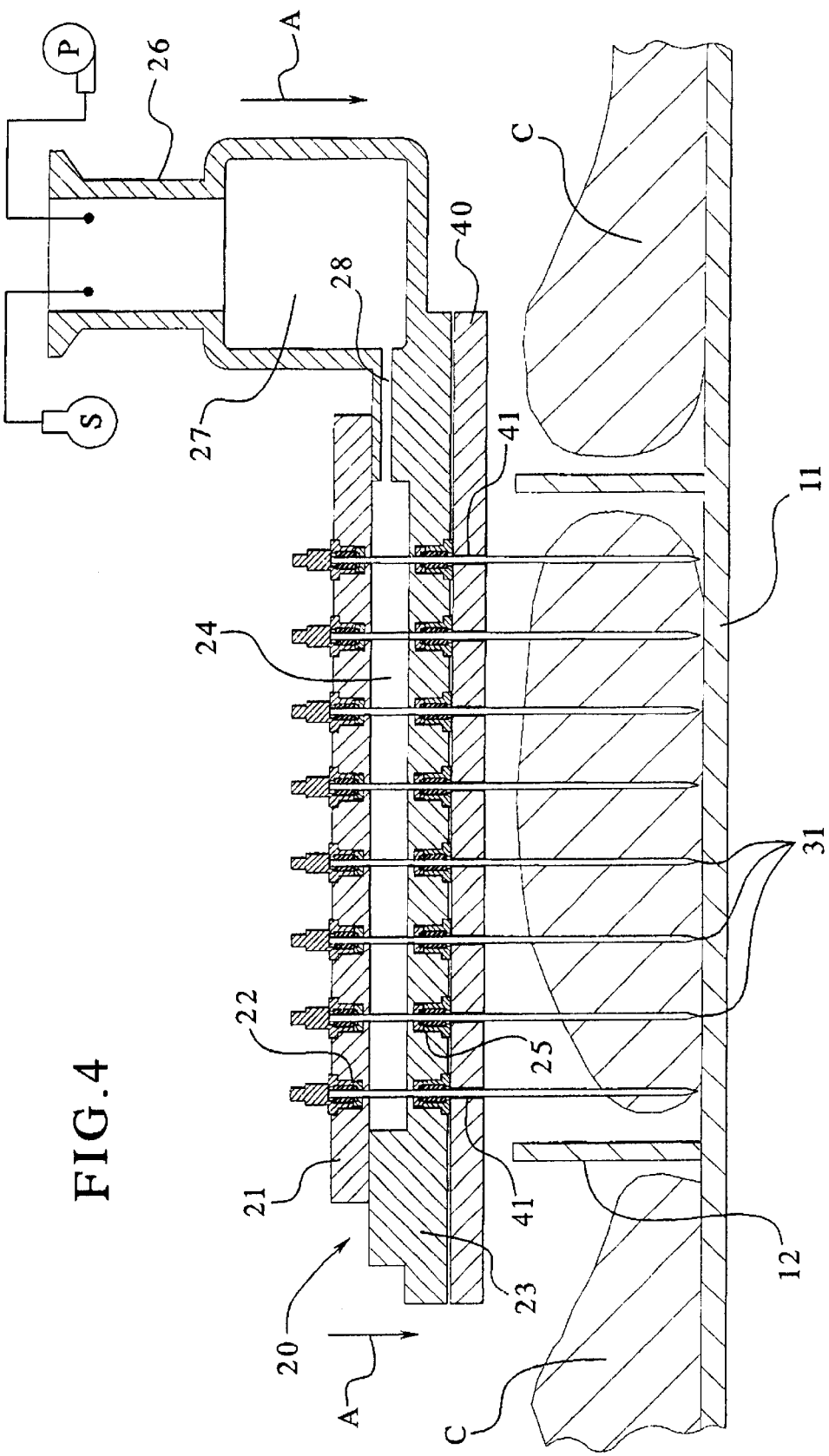
FIG. 4 is a view similar to FIG. 3 but showing the needles in the bottom position of the press down stroke and with the needles penetrating the flesh of the meat parts.

Turning now to FIG. 2–4, a press mechanism is provided inside of the enclosure 16. In accordance with this invention, the press mechanism includes a manifold 20, the details of which are shown in FIGS. 2 and 3. The manifold 20 has an upper manifold part 21 formed with a plurality of needle openings 22. A lower manifold part 23 is connected thereto and together therewith forms a manifold chamber 24. The lower manifold part 23 is similarly provided with a corresponding plurality of needle openings 25. The needle openings 22 and 25 are in precise axial alignment with one another and are disposed in an array of openings arranged in rows and columns on close centers to form a rectangular pattern generally co-extensive with the area of a tray 12 on the conveyor means 11.

A head means 26 is selectively supplied with a treatment medium. For example, a high output liquid pump P depicted diagrammatically drives a solution or formulation to the head means 26. Because of such function, the head means 26 is oftentimes referred to using the sobriquet of "brine head." In accordance with this invention, the so-called brine head 26 is also selectively connected with a source of pressurized high temperature steam "S" and is supplied with live steam at a temperature in the order of about 350 degrees Fahrenheit (F) and at a pressure ranging from 15 to 55 pounds per square inch (PSI). The brine head 26 forms a conduit 27 which carries the treatment medium, whether it be fluid, liquid, or live steam, to a passage 28 leading to the manifold chamber 24.

For each pair of needle openings 22 and 25 in the manifold 20, there is a hollow needle 30. The needles 30 are carried on the upper manifold part 21 and each needle 30 extends downwardly through its own opening 22 through the manifold chamber 24 and through its mating aligned opening 25 in the lower manifold part 23. The needles 30 are of uniform length and extend downwardly through a stripper plate 40 having plural matching openings 41. The stripper plate 40 acts to strip the meat "C" from the needles 30 when they are retracted on the up stroke of the press.

Actuating means (not shown) are provided to cycle the press including the manifold 20 and the needles 30 carried thereby through a vertical stroke which extends between an upper position shown in FIG. 3 and a lower position shown in FIG. 4. Thus, in the position of FIG. 3, the manifold 20 is spaced above the stripper plate 40. The needles 30 have sharpened points shown at 31 which are positioned in register with one of the trays 12 on the conveyor means 11, but at a level above the contents of the tray 12.

In FIG. 4, the actuating means has moved the press with its components including the manifold 20 and the needles 30 vertically in the direction of the arrows "A" (FIG. 4) to the lower position wherein the points 31 of the needles 30 have penetrated the contents of the tray 12, in this instance, the flesh of the chicken meat part, or chicken "C."

Figure 6:
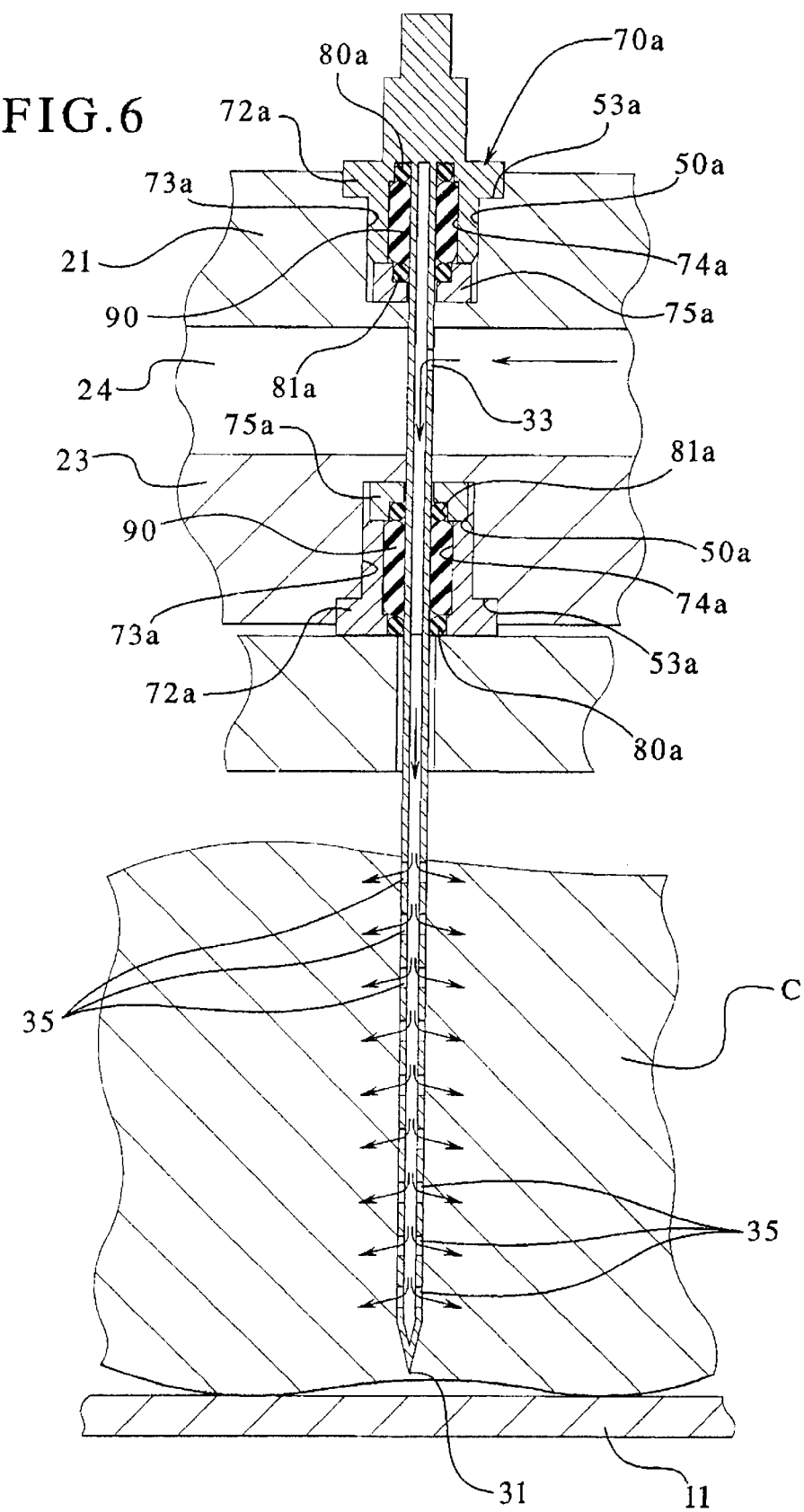
FIG. 6 is a fragmentary cross-sectional view showing a different form of the invention, but which is also suitable for dual utility, i.e., the thermal treatment of a food product with live steam at elevated temperatures and under pressure, or the injection of treatment medium at normal ambient temperatures, including corrosive solutions.

As shown in FIG. 6, each needle 30 has an opening 33 placing the manifold chamber 24 in communication with an elongate centrally disposed axial passage 34 within the interior of the needle 30. At the lower end of the needle 30, but inwardly of the point 31 of the needle 30, there is formed a plurality of openings 35. When the points 31 of the needles 30 penetrate the meat "C" and the needles 30 pass into and through the meat "C" the the pressurized fluid medium supplied to the manifold chamber will flow into the needles 30 and will be inserted into the interior of the meat "C." A press provided with the manifold 20 of the present invention reciprocates four hundred and eighty eight independent needles 30 disposed on close centers so that uniform distribution of treatment medium throughout the food product 30 being penetrated and injected is insured.

In accordance with the principles of the present invention, a special form of bushing construction is provided to support each needle 30 in its vertical position, and to support a seal in the upper and lower manifold parts 21 and 23 and to thereby prevent leakage of the treatment medium around the needle 30.

Figure 5:
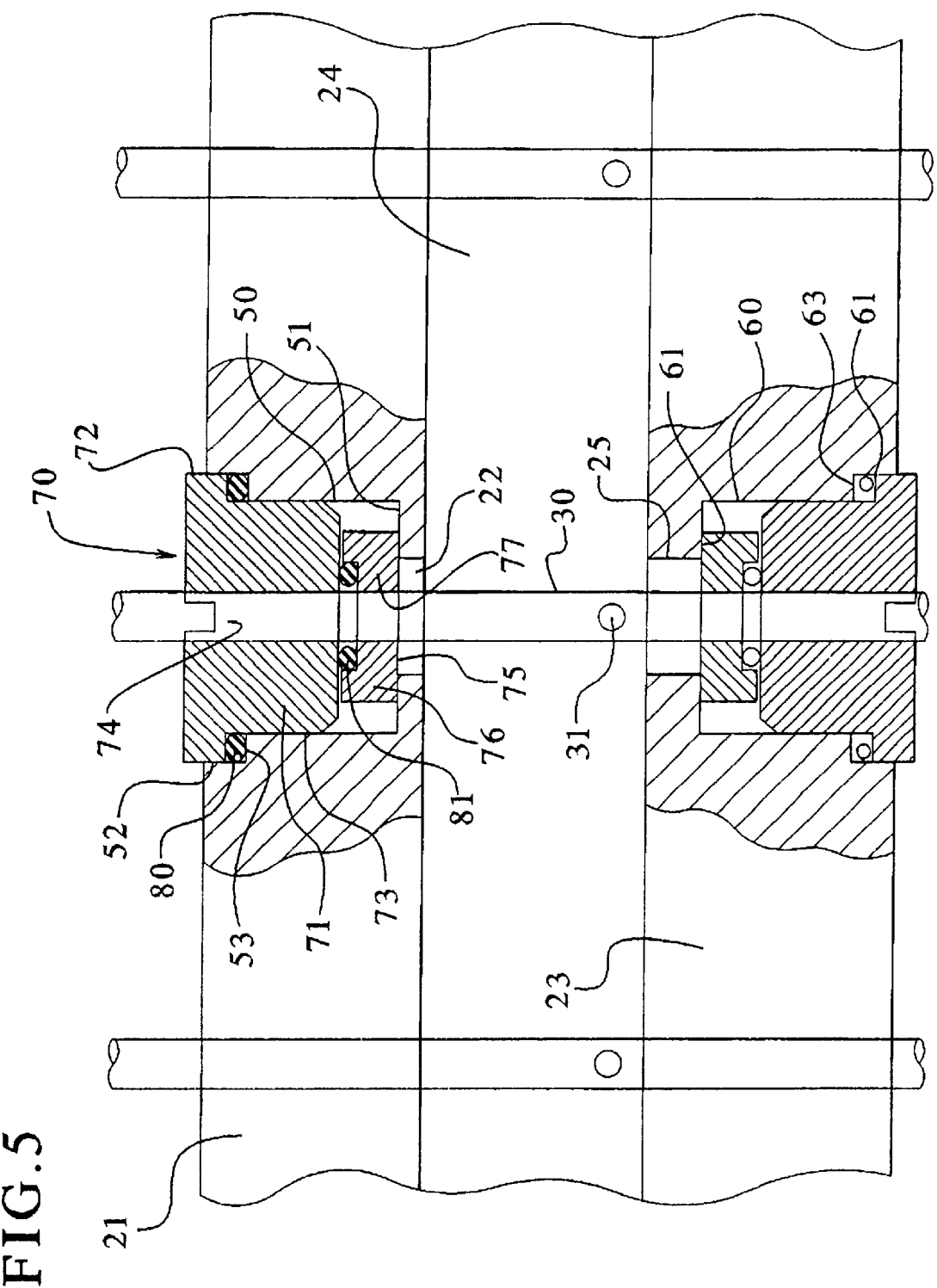
FIG. 5 is a fragmentary cross-sectional view showing details of one form of the bushing construction of the present invention particularly adapted for achieving thermal injection of live steam for thermally conditioning the interior of meat products, as well as for injecting treatment medium at normal ambient temperatures.

Referring to FIGS. 5 and 6, each opening 22 in the upper manifold part 21 is counter-bored in the upper surface of the manifold part 21 to provide a first recess 50 extending radially outwardly of and concentric to the vertical axis of the opening 22. The counter-bored recess 50 terminates in a radial shoulder 51 spaced outwardly of the manifold chamber 24. A second recess 52, also formed by counter-boring, extends radially outwardly of the vertical axis of the opening 22 and terminates in a radial shoulder 53.

Similar provisions are made in the lower surface of the lower manifold part 23. Each opening 25 in the lower manifold part 23 is counter-bored in the lower surface of the manifold part 23 to provide a first recess 60 extending radially outwardly of and concentric to the vertical axis of the opening 25 and terminating in a radial shoulder 61 spaced outwardly of the manifold chamber 24. A second recess 62, also formed by counter-boring, extends radially outwardly of the vertical axis of the opening 25 and terminates in a radial shoulder 63.

In one form of the invention, a bushing construction takes the form of two separate bushing parts. The first bushing part 70 is a cylinder 71 outwardly flanged as at 72 and having an outer wall 73 with a diametral dimension complemental to the inner diameter of the recess 50. The walls of a center axis opening 74 closely adjoin the needle 30. In order to securely lock the bushing construction in assembly with the manifold 20, the outer wall 73 and the inner diameter of the recess 50 are threaded and are threadedly engaged with one another.

The second bushing part 75 is a cylinder 76 inwardly flanged as at 77 and having an outer wall 78 with a diametral dimension greater than the opening 22 and less than the inner diameter of the recess 50.

Each of the first and second bushing parts 70 and 75 is made of 20% to 30% glass reinforced "POLYETHERETHERKETONE," (PEEK) a material which exhibits excellent mechanical properties, thermal properties and is chemically resistant to acids, alkalies and to all organic solvents. It can be fabricated in molded parts and is especially suitable for high-temperature environments.

An O-ring seal 80 made of "VITON," brand temperature resistant material is shown seated on the shoulder 53 and establishes a seal between the first bushing part 70 and the upper manifold part 21. The second bushing part 75 seats on the shoulder 51 and receives an O-ring seal 81 also made of "VITON" brand material to establish a seal with the needle 30 and the upper manifold part 21. "VITON" material exhibits excellent heat resistant characteristics and is ideally suited for use in high temperature environments.

Comparable bushing parts 70 and 75 and O-rings 80 and 81 are placed in the counter-bored openings of the lower manifold part 23 in the same manner and for the same purposes as those described and numbered in connection with the upper manifold part 21, and the description and numbering of the parts need not be repeated.

The bushing construction thus provided performs well in the environment of a thermal conditioning method environment for treating food products. Live steam at a temperature in the order of about 350 degrees F. and at pressure in the range of 15 to 55 psi is injected into chicken flesh with great efficiency and effectiveness without any deteriorative effect in the functional performance of the bushing construction. Accordingly, the versatility of a single injection machine 10 can be greatly enhanced with the use of the press components of the present invention.

In another form of the invention shown in FIG. 6, a first bushing part 70a and a second bushing part 75a are made of stainless steel. In structural configuration, both are quite similar in size and shape to their counter-part bushing parts 70 and 75. However, referring to FIG. 6 it will be noted than an outwardly extending flange 72a seats directly on a shoulder 53a and an axially extending center opening 74a is enlarged to receive a bushing insert sleeve 90 made of "TEFLON." A pair of O-rings are shown at 80a and 81a, each made of "TEFLON." They are inserted at the top of the bushing part 70a and in the recess provided by the flange of the second bushing part shown at 75a. As with the first bushing part 70, the bushing part 70a has an outer wall 73a which is threaded to threadedly engage the correspondingly threaded inner wall of the recess 50a.

Again, comparable parts are utilized in the lower manifold part 23 and may be referred to with similar reference numbers for the sake of convenience.

In both forms of the invention, the apparatus utilizing the bushing constructions of this disclosure has the ability of greatly expanded utility since it be used safely and effectively in marinating meat with formulated aqueous solutions at conventional operating temperatures, or it can be used for temperature conditioning meat and/or other food products with high temperature live steam at 350 F. and 15–55 psi.

Assuming that a user has employed the machine 10 for normal marinating operations with a formulated aqueous solution of marinade at normal temperatures, and wishes to use the machine 10 for temperature conditioning meat products, the machine 10 may be purged of marinade, if necessary or desirable, and then connected to a source of live steam as the source "S" and the temperature conditioning function, or methodology, will be carried out effectively and reliably.

While we have identified POLYETHERETHERKETONE and VITON brand material as presently available and satisfactory for the purposes of our invention, it should be understood that if other engineered materials displaying equivalent characteristics are, or become available, substitution of such equivalent materials would not be a departure from the spirit of this invention.

Although minor modifications might be suggested by those artisans skilled in the art, it should be understood that we wish to embody within the scope of the patent warranted hereon all such modifications as reasonably and properly come within the scope of our contribution to the art.

We claim as our invention:

1. In an injection machine utilizing a bank of hollow needles carried by a manifold and reciprocating vertically to insert a treatment medium into food products penetrated by the needles, the improvement of:
a multi-purpose bushing construction for each needle to support the needle in a vertical position and to support a seal for each needle in the manifold,
said bushing construction comprising first and second bushing parts,
said first bushing part being outwardly flanged and said second bushing part being inwardly flanged to seat in a counter-bored needle opening in said manifold,
head means forming a conduit selectively flowing a treatment medium to the manifold,
a high output liquid pump selectively driving formulated marinating solution at ambient temperatures to said head means,
steam source connecting means selectively supplying live steam at elevated temperatures and pressure to said head means for thermally treating food products,
each of said first and second bushing parts being made of 20% to 30% glass reinforced POLYETHERETHERKETONE and each having a centrally disposed axially extending opening sized to pass an injection needle in sealing relation therewith, thereby to accommodate aqueous solution treatment media at normal ambient temperatures as in marination, or thermal treatment media comprising live steam in the order of about 350 degrees Fahrenheit and at pressure in the range of 15 to 55 pounds per square inch to insert thermal energy internally of food products.

2. In an injection machine utilizing a bank of hollow needles carried by a manifold and reciprocating vertically to insert a treatment medium selected from a group consisting of (1) aqueous solution media and (2) thermal treating media into food products penetrated by the needles, the improvement of:

head means forming a conduit to selectively drive treatment media selected from the group consisting of (1) aqueous solutions at normal ambient temperatures and (2) thermal treatment media in the form of live steam at elevated pressure and temperature to the manifold, a pump selectively driving formulated marinating solution at ambient temperatures to said head means, steam source connecting means selectively supplying live steam at elevated temperatures and pressure to said head means for thermally treating food products, a bushing construction for each needle to support the needle in a vertical position and to support a seal for each needle in the manifold, said bushing construction comprising first and second bushing parts, said first bushing part being outwardly flanged and said second bushing being inwardly flanged to seat in firm assembly in a counter-bored needle opening in said manifold to support the needle in a vertical position, each of said first and second bushing parts being made of stainless steel, and each having axially extending recesses sized to receive sealing means made of plastic material for establising a sealing relation between said bushing parts and the needle extending there through in the manifold, whereby the treatment media for aqueous solutions and for thermal treatment may be selectively employed in the same injection machine.

3. A multi-purpose fluid injector system for selectively processing food products thermally or with aqueous solutions in the same injector machine comprising:

a tray compartmented conveyor means for tray loading and transporting food product units along a prescribed path, a fluid injector station in said path comprising a press mechanism selectively supplying aqueous solution injector treatment medium at normal ambient temperatures or thermal injector treatment in the form of live steam at elevated temperature and pressure, control means controlling said conveyor means and being programmed to temporarily stop said conveyor means with a tray compartment in register with said press mechanism of said fluid injector station, said press mechanism having multiple independent needles disposed on close centers in an array pattern corresponding to the included area of a tray compartment and being moveable in a vertical stroke towards and away from the tray compartment and piercing the food product in the tray compartment, each of said independent needles having an internal axial passage with a radial inlet and outlet openings through which a treatment medium may be directed for insertion into the interior of a food product carried in said tray compartment, said press mechanism further comprising upper and lower manifold parts together with one another forming a manifold chamber through which each of said independent needles is extended, head means forming a conduit connected to said manifold, a pump selectively supplying pressurized treatment medium to said head means for supplying formulated marinating solutions at ambient temperature to said manifold chamber, steam connecting means for selectively supplying live steam at elevated temperatures and pressure to said manifold as a food thermal treatment medium, a stripper plate between said conveyor means and said lower manifold to insure separation of the food products from the needles when they are retracted, and a separate bushing construction for each needle in each of said manifold parts, each of said bushing constructions including first and second bushing parts supporting a corresponding needle in an axial position on the vertical axis of the respective independent needle, and supporting a seal preventing leakage of treatment medium around the area of the needle in the manifold, each needle having said inlet disposed to register with said manifold chamber and having said outlet openings disposed to discharge treatment medium into the interior of food product penetrated by the needle, each said bushing construction comprising:

a first cylindrical body outwardly flanged at one end thereof to seat on a complementally shaped counter-bored seat in said manifold, said second body being made of 20% to 30% POLYETHERETHERKETONE (PEEK), and O-rings cooperating with said first and second bodies and being made of heat resistant material, said first and second bushing parts being constructed of material which exhibits thermal properties resistant to the high temperature of live steam in the order of 350 degrees F. at 15 to 55 p.s.i. and which is chemically resistant to acids, alkalies and organic compounds, whereby the bushing construction will effectively seal against leakage of aqueous solution treatment medium at normal ambient operating temperatures as well as against leakage of a thermal treatment medium consisting of live steam at elevated temperature and pressure.

4. In an injection machine of the type utilizing a vertically reciprocating press means having hollow needles to inject a treatment medium into meat food products consisting of beef, pork, whole chickens and chicken parts temporarily positioned under the press in the machine, the improvement of:

a manifold having upper and lower manifold parts together with one another forming a manifold chamber for receiving a treatment medium selected from a group of multiple types of media consisting of (1) aqueous marinades at normal ambient temperature and (2) thermal temperature conditioning media consisting of live steam at elevated temperature and pressure, said manifold having a brine head forming a conduit connected to a high output liquid pump selectively driving a marinating solution at ambient temperatures to the brine head and said conduit of said brine head connected to a source of live steam selectively driving a thermal treatment medium at elevated temperatures and pressure to the brine head, said manifold parts having a plurality of needle openings therein, and a bushing in each said needle opening supporting each respective needle in a vertical position in the manifold and supporting a seal in the manifold sealing against leakage of the treatment medium around each respective needle, whereby the bushing construction will effectively seal against leakage with a treatment medium of whatever type in the group consisting of aqueous marinades at normal ambient temperature and thermal temperature conditioning medium consisting of live steam at elevated temperature and pressure, said bushing being made of polyetheretherketone and having O-ring seal means made of heat resistant material, so that the treatment medium used in the machine as thermal temperature conditioning medium may selectively constitute live steam at a temperature in the order of 350 degrees F. and at a pressure of 15 to 55 p.s.i.

5. In a meat injector machine for treating various meat products comprising beef, pork, whole chickens and chicken parts, a manifold having a horizontal manifold chamber between upper and lower manifold walls and having a brine head through which said manifold chamber is supplied with a selectively different pressurized treatment medium selected from a group consisting of (1) liquid aqueous marinades at normal ambient temperature, and (2) thermal conditioning live steam at elevated temperature and pressure, a pump selectively supplying (1) to said brine head, a live steam source selectively supplying (2) to said brine head, a plurality of needle openings in said upper and lower walls of said manifold through which a corresponding plurality of needles are extended, each needle having a centrally disposed elongated passage disposed to extend vertically and including an inlet means in register with said manifold chamber to communicate therewith, each said needle having a sharpened point and including discharge openings inwardly of each said point through which a treatment medium from said manifold chamber may be inserted into the interior of meat food products penetrated by the point of each said needle, each of said needle openings in said upper and lower walls of said manifold being counter-bored in the upper surface of said upper manifold part and in the lower surface of said lower manifold part to provide a threaded bushing recess at each needle opening, each said bushing recess terminating at a radial wall in the corresponding manifold part outwardly of said manifold chamber, and a bushing in each of said bushing recesses to support the needle in a vertical position and to support a seal in the manifold, said bushing comprising a two part assembly comprising a first externally threaded cylinder part threaded into said bushing recess in firm assembly with said manifold and thereby supporting the needle in a vertical position, a second cylinder part seated on said radial wall and engaged by said first cylinder part, and O-ring sealing means retained by said bushing, said bushing being made of POLYETHERETHERKE-TONE (PEEK) material and said O-ring sealing means being made of heat resistant material, thereby to accommodate the use of high temperature pressurized treatment medium in said injection machine consisting of live steam at a temperature in the order of about 350 degrees F. and at a pressure of 15 to 55 p.s.i. as well as liquid aqueous solutions at normal ambient temperatures and conventional operating pressures.

6. In a meat injector machine for treating various meat products comprising beef, pork, whole chickens and chicken parts, a manifold having a horizontal manifold chamber between upper and lower manifold walls and having a brine head through which said manifold chamber is supplied with a selectively different pressurized treatment medium selected from a group consisting of (1) liquid aqueous marinades at normal ambient temperature, and (2) thermal conditioning live steam at elevated temperature and pressure, a pump selectively supplying (1) to said brine head, a live steam source selectively supplying (2) to said brine head, a plurality of needle openings in said upper and lower walls of said manifold through which a corresponding plurality of needles are extended, each needle having a centrally disposed elongated passage disposed to extend vertically and including an inlet means in register with said manifold chamber to communicate therewith, each said needle having a sharpened point and including discharge openings inwardly of each said point through which a treatment medium from said manifold chamber may be inserted into the interior of meat food products penetrated by the point of each said needle, each of said needle openings in said upper and lower walls of said manifold being counter-bored in the upper surface of said upper manifold part and in the lower surface of said lower manifold part to provide a threaded bushing recess at each needle opening, each said bushing recess terminating at a radial wall in the corresponding manifold part outwardly of said manifold chamber, and a bushing in each of said bushing recesses to support the needle in a vertical position and to support a seal in the manifold, said bushing comprising a two part assembly comprising a first externally threaded cylinder part threaded into said bushing recess in firm assembly with said manifold and thereby supporting the needle in a vertical position, a second cylinder part seated on said radial wall and engaged by said first cylinder part, and O-ring sealing means retained by said bushing, said bushing being made of stainless steel and said O-ring being made of plastic material, thereby to accommodate both liquid aqueous solution treatment media at normal ambient operating temperatures as well as a high temperature pressurized treatment medium consisting of live steam at a temperature in the order of about 350 degrees F. and at a pressure of 15 to 55 p.s.i. in said injection machine.

* * * * *